Figure 1:
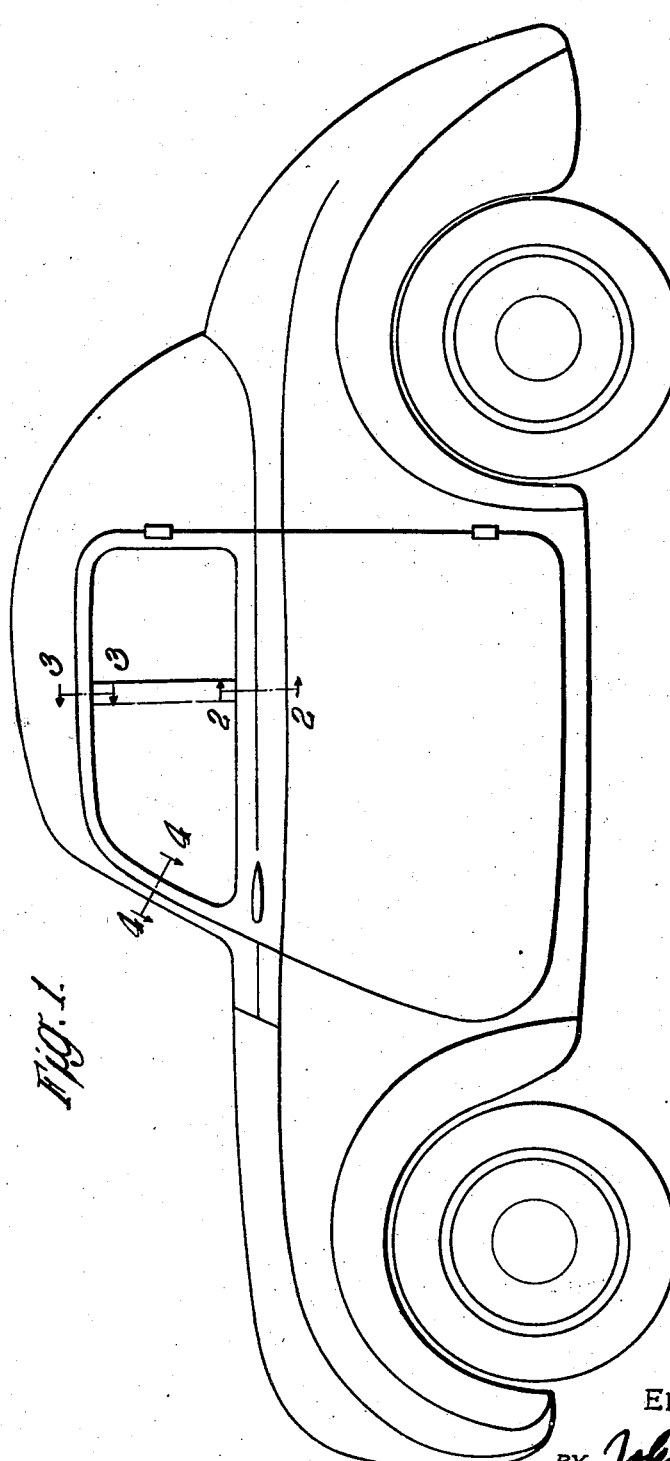

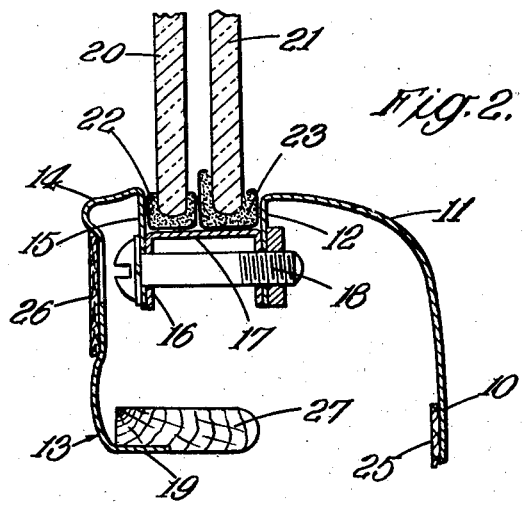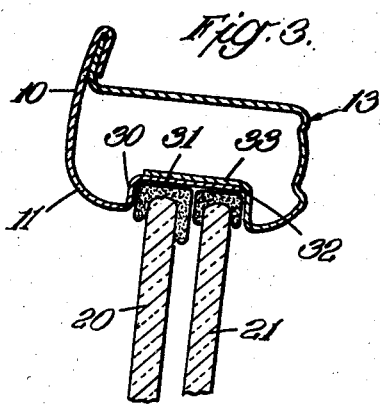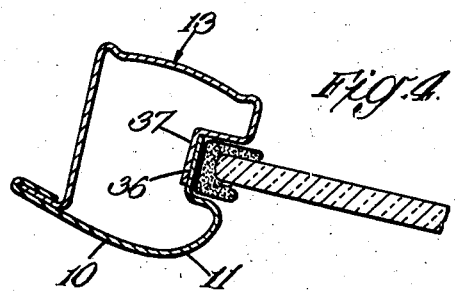

Patented Aug. 22, 1944

2,356,123

UNITED STATES PATENT OFFICE 2,356,123

MOUNTING OF WINDOW GLASS IN VEHICLE WALL STRUCTURES

Edmund Speed, Headington, Oxford, England, assignor to Pressed Steel Company Limited, Cowley, Oxford, England, a British company Application March 8, 1940, Serial No. 322,902 In Great Britain March 10, 1939

2 Claims. (Cl. 296—47)

This invention relates to the mounting of the window glass in vehicle wall structures of the kind incorporating fixed or substantially horizontally sliding window glasses, and has for its object to provide a construction which is simple and cheap, one in which the window glasses are assembled in the vehicle wall structure readily and one in which the general appearance thereof is improved.

To these ends and in accordance with the present invention a vehicle wall structure, e. g., a door, consists of an outer panel formed with a window opening therein and an inner panel or framework, the latter consisting of a unitary or built-up channel, or like section structure, arranged to co-operate with, and to reinforce the margins of said outer panel, the said inner panel or framework constituting a retainer for the window glasses all the way around said opening and presenting at the same time an internal moulding integral with said panel or framework, the outer panel and the inner panel or framework being each formed along the lower margins of the window opening with substantially vertical down-turned flanges spaced apart to provide an aperture through which are inserted the window glasses, said aperture being closed by an inverted channel section or like strip interconnecting said flanges, the bottom of said strip forming also the base of the lower glass-run channel.

In wall structures of the kind referred to at present in use the window opening in the inner panel or the inner framework is of a size greater than the size of the window glasses to permit their insertion from inside the structure, and in such case it is necessary to supply a separate one-piece or like moulding acting also to retain the window glasses in position.

By the present invention such a separate moulding is eliminated and in order to assemble the window glasses in the wall structure they must be inserted from within and below the window opening passing up through an aperture between the outer panel and the inner framework.

One example of the invention will now be described more in detail in connection with a vehicle door, reference being had to the accompanying drawings, of which, Figure 1 is an outline drawing of a vehicle, and Figures 2, 3 and 4 are sections on the lines 2—2, 3—3 and 4—4 respectively of Figure 1.

The outer panel 10 of the door is swept inwardly as at 11 around the entire window opening to constitute an exterior moulding. Along the lower margin of the window opening the outer panel 10 is formed with a substantially vertical down-turned flange 12. The inner panel or reinforcement 13 is generally of channel section facing towards the outer panel 10 and along the lower margin of the window opening is formed with an inturned moulding 14 and a substantially vertical down-turned flange 15, spaced from the down-turned flange 12 of the outer panel 10.

The spacing between the flanges 12 and 15 provides the aperture through which the window glasses 20 and 21 carrying felt or like channels 22, 23 are inserted from within and below the window opening.

In order to close this aperture an inverted channel section strip 16 is inserted the base 17 of said strip forming the bottom run for the window glasses 20 and 21, whilst said strip is secured firmly to the flanges 12 and 15 by means of the bolt 18. If it should become necessary to replace either or both window glasses it is a simple procedure to remove the strip 16 and drop out the window glass for replacement.

The inside of the outer panel 10 may be trimmed by securing directly thereto, for example, cloth covering 25, whilst the inner reinforcement 13 may be trimmed directly by painting thereon or by securing thereto a decorated millboard or like strip 26. To the lower inturned flange 19 of the inner reinforcement 13 is secured a wooden or like strip 27 serving as a finger grip to assist in manipulating the door and also as a guard against possible damage by contact with the edge of said flange 19.

Along the upper margin of the window opening the outer panel 10 is flanged inwardly as at 30 and then transversely as at 31, whilst the inner reinforcement 13 is flanged at 32 and 33 similarly, the flanges 31 and 33 being joined, for example, by welding to constitute the bottom of the glass run channel.

Along the forward vertical margin of the window opening the construction is similar to that shown in Figure 3 with the exception that the transverse flanges 36 and 37 of the outer panel 10 and the inner reinforcement 13 are of less length in that the glass run channel to which they form the bottom is to accommodate only one and not two window glasses as do the top and bottom margins of the window opening.

It will be clear that a construction corresponding with that described in detail above is applicable equally to the mounting of a windshield, quarter-light, or a back-light glass or glasses whether or not such glass or glasses be fixed or adapted to slide.

I claim:

1. In a vehicle wall structure such as a door; an outer panel and an inner panel, both surrounding a window opening; window-retaining means formed between the panels along all four margins of the opening; said means constituting at least along the upper and lower margins of the opening channels adapted for the reception of the corresponding margins of a window; the bottom wall of the channel along the lower margin of the opening being removably connected to the remainder of the structure so as to permit the insertion or removal of the window upon removal of said bottom wall whereas the window is securely held in said structure when said bottom wall is secured in place.

2. In a vehicle wall structure such as a door; an outer panel and an inner panel, both surrounding a window opening; window-retaining channels at least along the upper and lower margins of the opening; the panels being provided along the lower margin of the opening with integral down-turned flanges forming the side walls of the window-retaining channel along its margin; the bottom wall of the channel along the same lower margin being formed by the bottom wall of an inverted channel-section member having its side walls removably connected to side flanges so as to allow, upon removal of said channel-section member, the insertion or removal of the window.

EDMUND SPEED.